Sept. 27, 1938.　　　A. P. HUGHES　　　2,131,663
ROASTER
Filed Feb. 21, 1938
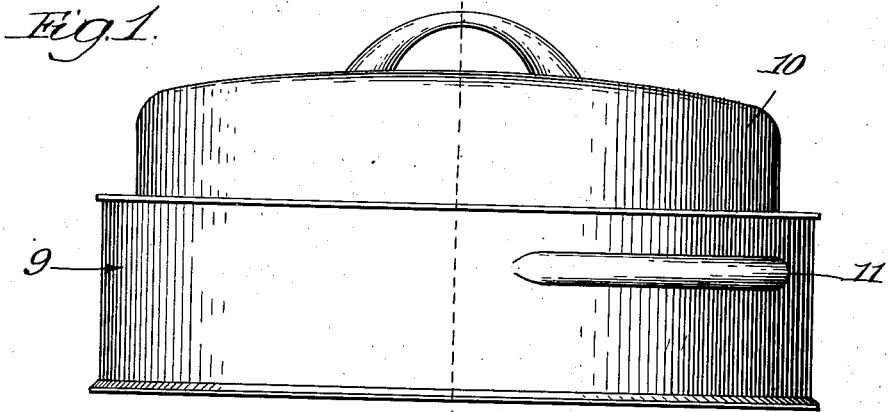
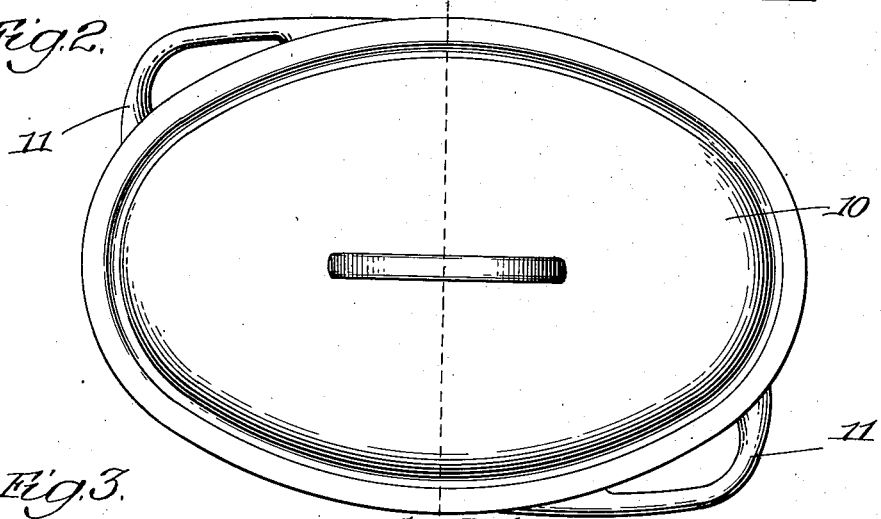
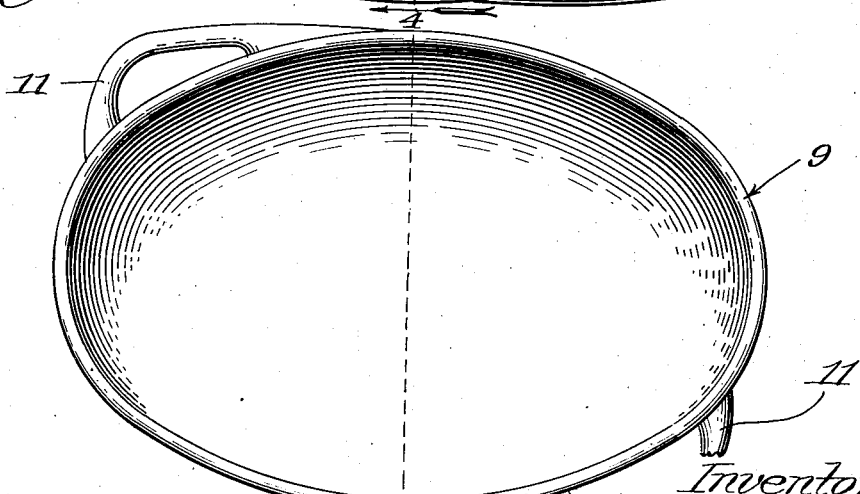
Inventor:
Ambrose P. Hughes,
By Chritton, Wiles, Davies, Hirsch & Dawson,
Attys.

Patented Sept. 27, 1938

2,131,663

UNITED STATES PATENT OFFICE 2,131,663

ROASTER

Ambrose P. Hughes, Chicago, Ill.

Application February 21, 1938, Serial No. 191,756

3 Claims. (Cl. 53—6)

One phase of my invention relates to improvements in roasting pans, my primary object in this connection being to provide improvements in the handle portions thereof whereby danger of burning the hands or arms of the person placing the roasting pan in a hot oven, or removing it therefrom, will be reduced to the minimum, if not entirely prevented, the overall dimensions of the pans will be reduced for any given capacity of pan, thereby permitting of the use of longer pans in a given size oven than heretofore possible, and a steadier grip on the pan, minimizing tendency to tipping, may be obtained.

Referring to the accompanying drawing:

Figure 1 is a view in side elevation of a roaster embodying my invention;

Figure 2 is a plan view of the roaster; and

Figure 3, a plan view of the body or pan portion of the roaster.

Referring to the preferred illustrated embodiment of my improved roaster, it comprises a pan or body portion 9 and a cover 10 as commonly provided in this kind of utensil, the pan portion 9 being preferably of general oval shape in plan and provided at its opposite sides adjacent its ends, with handles represented at 11 at which the operator may grasp the pan for supporting it as for example in inserting it into, or removing it from, an oven.

The handles shown as of general U-shape and attached at their ends to the pan portion 9, but which may be of any other desirable shape or construction, preferably extend not beyond the ends of the pan portion nor beyond the planes of its sides at its wider part, whereby a pan of much greater capacity may be utilized in a given size oven than is possible in the case of pans as hitherto provided. However, extension of the handles beyond the ends of the planes of its sides would cause the pan to afford a measure of the advantage stated, depending on the extent to which the handles so projected and would be within my invention. Furthermore, the location of the handles at opposite sides, adjacent the ends, of the pan when of substantially rectangular shape would afford the advantage of permitting of the use of a longer pan in a given size oven than hitherto possible.

The provision of the handles 11 as stated also causes them to serve to greatly minimize danger of burning the operator's hands or arms. In the common form of roaster the operator usually grasps the rear handle from above the roaster which often results in burning the hand or arm by contact with the oven. By my construction the handles would be grasped from the sides of the roaster and thus reduce the hazard referred to. Furthermore, the provision of the handles as described enables the operator to obtain a steadier grip on the pan and overcomes the tendency of the tilting thereof.

While I have illustrated and described a certain particular structure embodying my invention I do not wish to be understood as intending to limit it thereto as the structure shown may be variously modified and the invention embodied in other forms of structure without departing from the spirit of my invention.

What I claim as new and desire to secure by Letters Patent, is:

1. A roasting pan of general oval shape having handles at its sides adjacent opposite ends of the pan.

2. A roasting pan of general oval shape having handles at its sides adjacent opposite ends of the pan, said handles not extending substantially beyond the ends of the pan.

3. A roasting pan of general oval shape having handles at its sides adjacent opposite ends of the pan, said handles not extending substantially beyond the ends of the pan nor substantially beyond planes tangential to the sides of the pan at its greatest width.

AMBROSE P. HUGHES.